(12) United States Patent
Lamendola

(10) Patent No.: US 6,363,889 B1
(45) Date of Patent: Apr. 2, 2002

(54) APPARATUS FOR CREATING AN UNDERWATER, AIR-FILLED ENVIRONMENT

(76) Inventor: Christopher J. Lamendola, 4144 Courtland Terr., Rockford, IL (US) 61109

( * ) Notice: Subject to any disclaimer, the term of this patent is extended or adjusted under 35 U.S.C. 154(b) by 0 days.

(21) Appl. No.: 09/626,969

(22) Filed: Jul. 27, 2000

Related U.S. Application Data

(63) Continuation-in-part of application No. 09/318,329, filed on May 25, 1999, now abandoned, which is a continuation-in-part of application No. 09/010,212, filed on Jan. 21, 1998, now abandoned.

(51) Int. Cl.$^7$ .............................................. A01K 63/00
(52) U.S. Cl. ...................................... 119/246; 119/256
(58) Field of Search ...................... 119/245–248, 251, 119/253, 254, 256, 269

(56) References Cited

U.S. PATENT DOCUMENTS

| | | | | |
|---|---|---|---|---|
| 4,204,499 A | * | 5/1980 | Leyva et al. ................ | 119/246 |
| 4,787,336 A | * | 11/1988 | Lineberry ................... | 119/246 |
| 5,031,572 A | * | 7/1991 | Dana .......................... | 119/246 |
| 5,313,912 A | * | 5/1994 | O'Dell ....................... | 119/246 |
| 5,337,701 A | * | 8/1994 | Syers .......................... | 119/251 |
| 5,957,085 A | * | 9/1999 | Youngstrom et al. ....... | 119/246 |

* cited by examiner

Primary Examiner—Charles T. Jordan
Assistant Examiner—Kimberly S Smith
(74) Attorney, Agent, or Firm—Keith Frantz

(57) ABSTRACT

A portable apparatus is adapted to provide an underwater living environment for air breathing creatures in, for example, an aquarium. The apparatus includes a housing with a sealed upper portion and an open lower portion to allow the creatures to enter into and exit from inside the housing. During normal use, air pumped into the housing exits past a control surface formed in the lower portion of the housing to establish an air-filled chamber in the housing. A weighted base releasably connected to the housing counteracts the buoyancy forces on the air-filled housing to maintain the housing in a submerged position at the bottom of the aquarium. A dry crawling surface is provided for the creatures inside the air-filled chamber by positioning relatively large rocks or driftwood between the base and the housing, such objects being sized to extend into the air-filled chamber. The apparatus also includes provision for adjusting the height of the water level within the air-filled chamber.

18 Claims, 8 Drawing Sheets

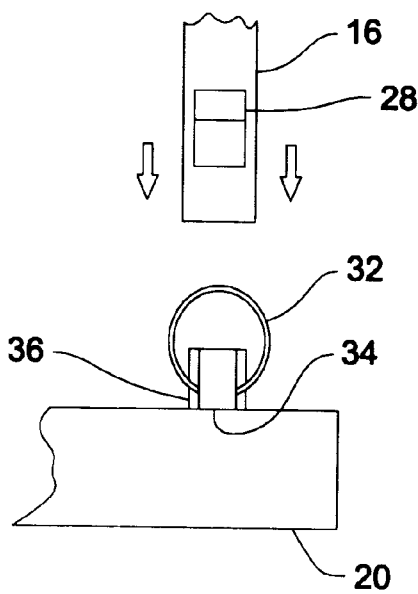
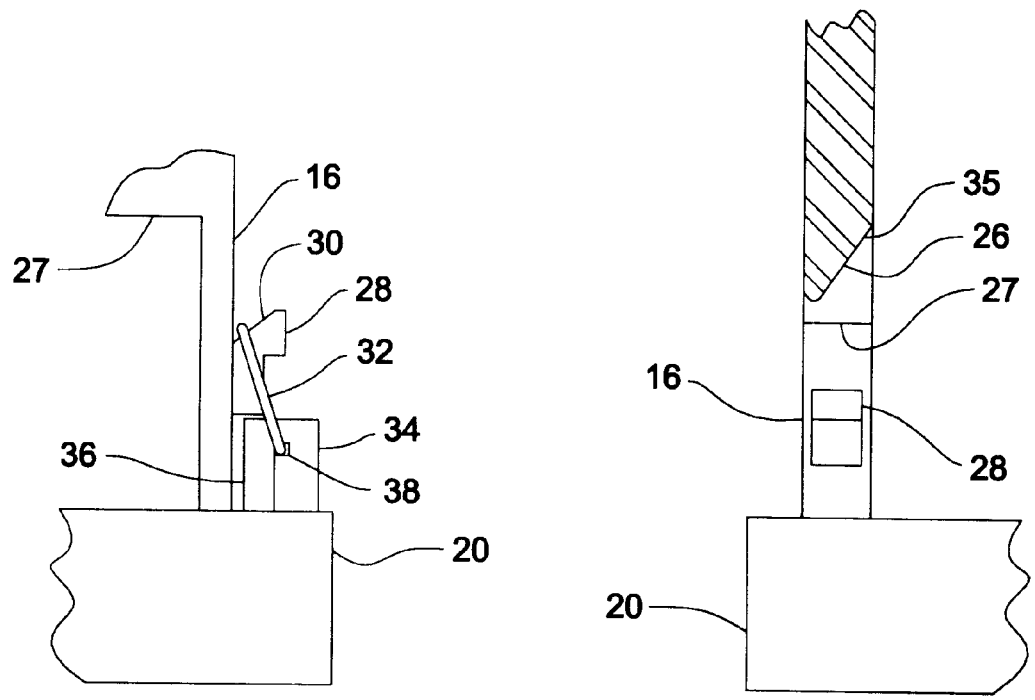
Fig 5
Fig 6
Fig 7

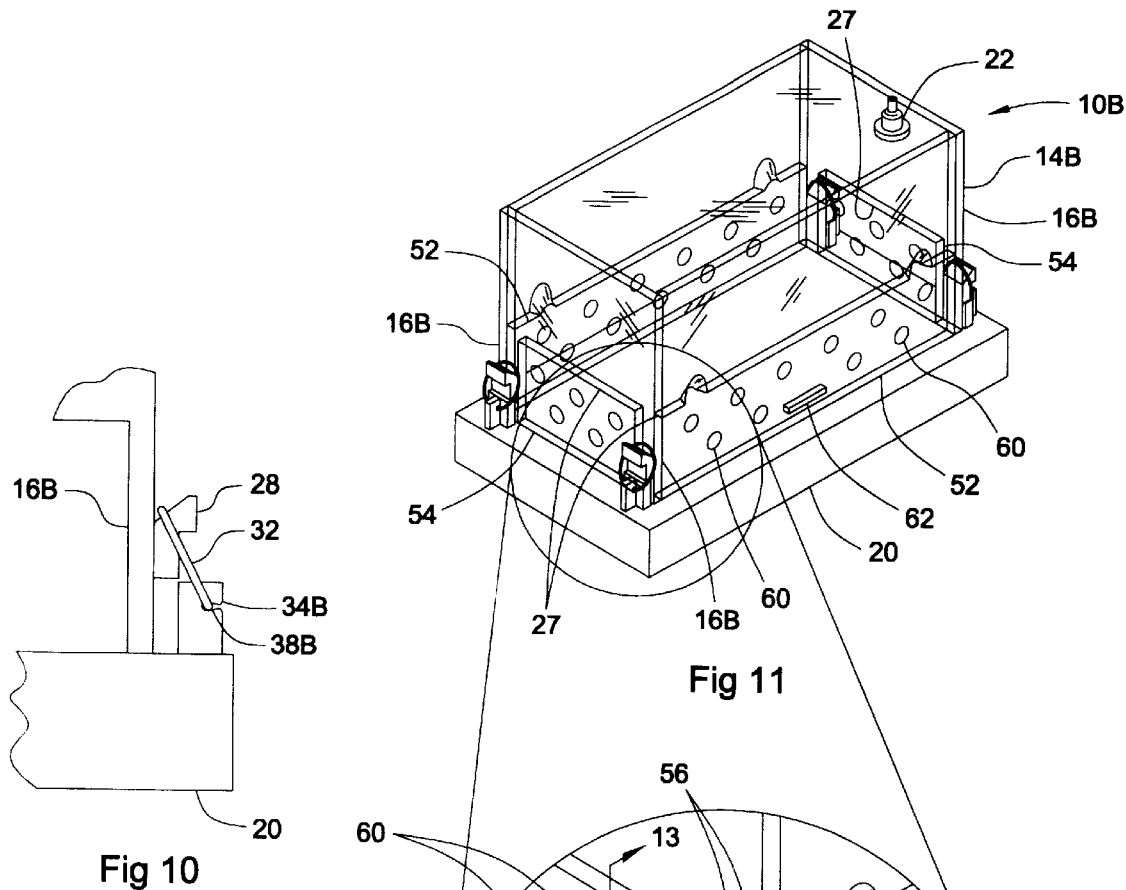

APPARATUS FOR CREATING AN UNDERWATER, AIR-FILLED ENVIRONMENT

This application is a continuation-in-part (CIP) application of patent application by Lamendola, application Ser. No. 09/318,329, filed May. 25, 1999, now abandoned, which application was a continuation-in-part of patent application Ser. No. 09/010,212, filed Jan. 21, 1998, now abandoned.

BACKGROUND OF THE INVENTION

The present invention relates generally to apparatus adapted for underwater use, and more specifically to apparatus which is especially useful in providing a life-supporting environment for air-breathing creatures such as amphibians and crustaceans in an aquatic environment.

For entertainment and educational purposes, it is desirable to provide a closed environment adapted for fish and air-breathing creatures, such as crabs, turtles, frogs, and other amphibians, crustaceans and reptiles, so that the aquatic creatures and the air-breathing creatures may interact as they do in nature.

Conventional aquariums are generally limited to providing a single, life-supporting environment for either fish or air-breathing creatures, and prior attempts to provide an interactive environment in an aquarium have been generally undesirable and met with limited success.

For example, one prior arrangement includes a vertical dividing wall secured in the center of an aquarium. One side of the aquarium is filled with water, while the other side is filled with rock and other land-creating material to provide a dry-land crawling surface for the air-breathing creatures and to allow movement of such creatures into and out of the water. In such set-ups, the dividing wall typically extends to approximately one-half the height of the aquarium to prevent the air-breathing creatures from escaping. As a result, only one-forth of the aquarium is filled with water, one-forth is filled with rock, and the upper half of the aquarium remains substantially unused. In other words, such prior arrangements result in extremely inefficient use of the space available within the aquarium.

Thus, it is desirable to provide an apparatus for creating an air-filled environment within the water-filled aquarium to permit full utilization of the space in the aquarium. It is also desirable to provide such apparatus as an accessory that may be quickly and easily installed into a conventional aquarium.

SUMMARY OF THE INVENTION

The general aim of the present invention is to provide a new apparatus adapted to create an underwater, life-supporting environment for air-breathing species in an aquarium or other aquatic environment.

Another objective of the invention is to create such environment within a portable apparatus that may be easily installed into and removed from a conventional aquarium.

A more detailed objective is to achieve the foregoing by providing (1) an enclosure having a sealed upper portion and a downwardly facing lower open portion to allow the air-breathing creatures to freely enter into and exit from the enclosure, (2) a continuous supply of air into the enclosure when the enclosure is submerged, and (3) a control surface formed in the lower portion of the enclosure and past which air escapes to provide for air exchange in the enclosure and to maintain the water level inside of the enclosure at the height of the control surface, resulting in an "open" air-filled chamber in the enclosure that is submerged in the aquarium.

Another detailed objective of the invention is to provide a "dry-land" crawling surface such as rocks or driftwood positioned under and extending into the air-filled chamber to establish a dry-land crawling surface to enable the creatures passage into and our of the submerged enclosure.

Still another detailed objective is to form the enclosure from transparent material to enable viewing of the species within, and as they enter and exit the air-filled enclosure.

The invention also resides in the provision of a unique portable weighted base to which the enclosure may be releasably connected, and which is capable of maintaining the entire apparatus on the bottom of the aquarium, thus providing for ease of installation and removal of either the enclosure or the entire apparatus from an aquarium.

Yet another objective of the invention is to provide means for quickly and easily adjusting the height of the water in the enclosure.

These and other objectives and advantages of the invention will become more apparent from the following detailed description when taken in conjunction with the accompanying drawings.

BRIEF DESCRIPTION OF THE DRAWINGS

FIG. 5 is an enlarged fragmentary exploded view of certain parts shown in FIG. 4.

FIG. 6 is an enlarged view taken substantially along the line 6—6 of FIG. 2.

FIG. 7 is an enlarged fragmentary cross-sectional view taken substantially along the line 7—7 of FIG. 1.

FIGS. 9 and 10 are views similar to FIG. 6 of additional alternate embodiments for releasably connecting the housing and base of the apparatus.

FIGS. 11 and 12 are views similar to FIGS. 3 and 4, respectively, of still additional alternate embodiments of the invention.

Figure 1:
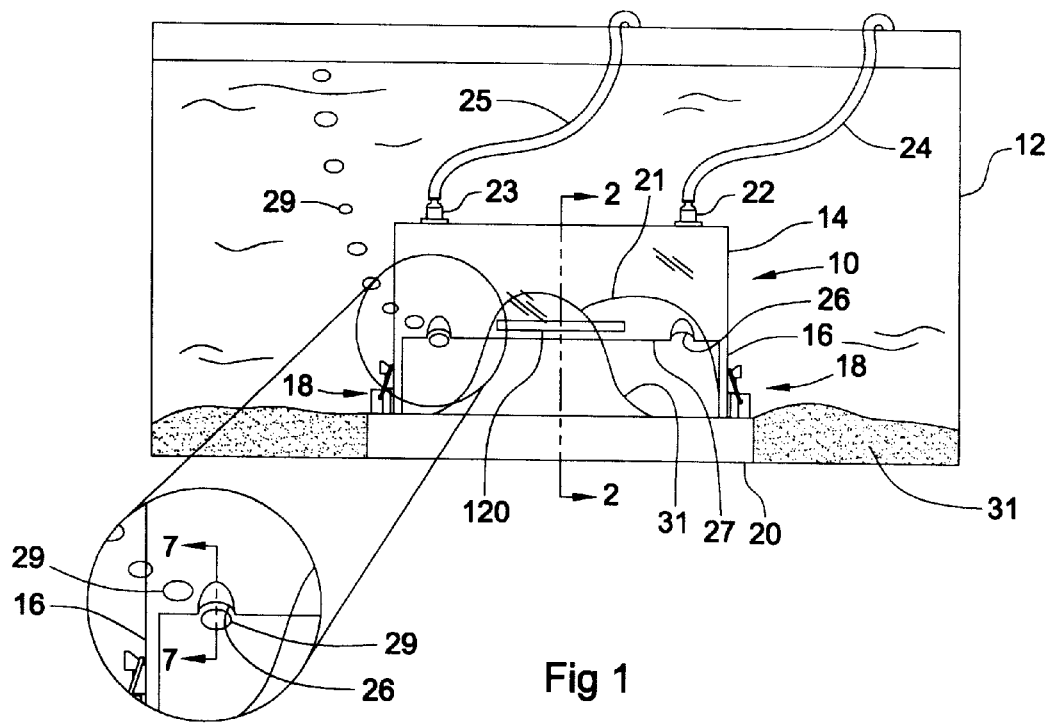
FIG. 1 is a front elevation view of a new and improved apparatus submerged in an aquarium and incorporating the unique aspects of the present invention.

While the invention is susceptible of various modifications and alternative constructions, certain illustrated embodiments have been shown in the drawings and will be described below in detail. It should be understood, however, that there is no intention to limit the invention to the specific forms disclosed, but on the contrary, the intention is to cover all modifications, alternative constructions, and equivalents falling within the spirit and scope of the invention.

DETAILED DESCRIPTION OF PREFERRED EMBODIMENTS

For purposes of illustration, the present invention is shown in the drawings in connection with a habitat 10 (FIG. 1) adapted for use in an aquarium 12. The aquarium is of a conventional type, having a horizontal bottom and upstanding transparent walls to define an enclosure capable of holding a body of water.

In accordance with the present invention, the habitat 10 provides for a unique air-filled enclosure adapted to create an underwater, life-supporting environment for air-breathing species. As a result, species such as amphibians may remain in the aquarium for relatively long periods of time while the habitat provides a unique, visual experience for observers.

In general, the habitat 10 includes a housing 14, a base 20, and means for connecting the housing to the base. The housing includes a closed upper portion defining an enclosure 15 (FIG. 2) adapted to trap air when submerged in water, and a generally open, downwardly facing lower portion. The base is formed with sufficient weight to counteract the buoyancy forces acting on the submerged, air-filled housing such that the base, and thus the habitat, rests on the bottom of the aquarium. The weighted base may be formed of any suitable material or construction, and in any convenient shape, such as the rectangular, concrete filled enclosure shown in FIG. 2. Such an arrangement enables the habitat to be portable for ease of installation into, and removal from, a conventional aquarium.

Figure 2:
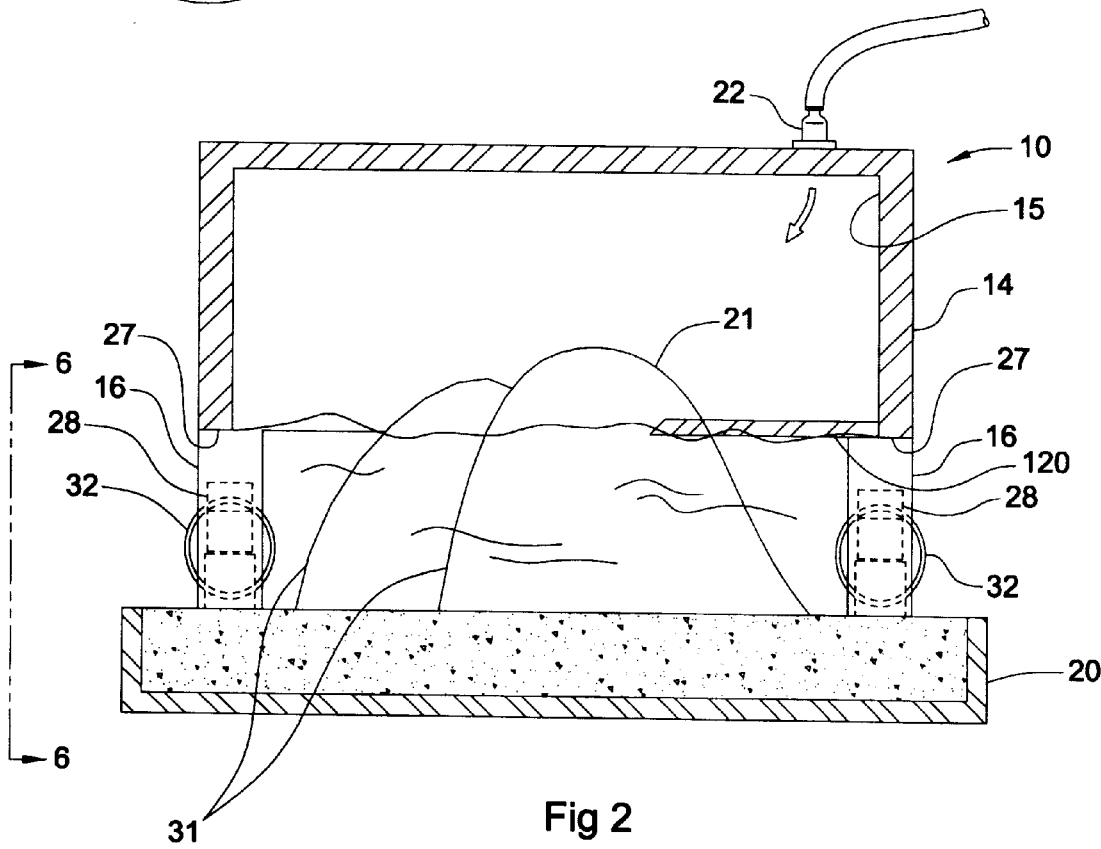
FIG. 2 is an enlarged cross-sectional view taken substantially along the line 2—2 of FIG. 1.
Figure 3:
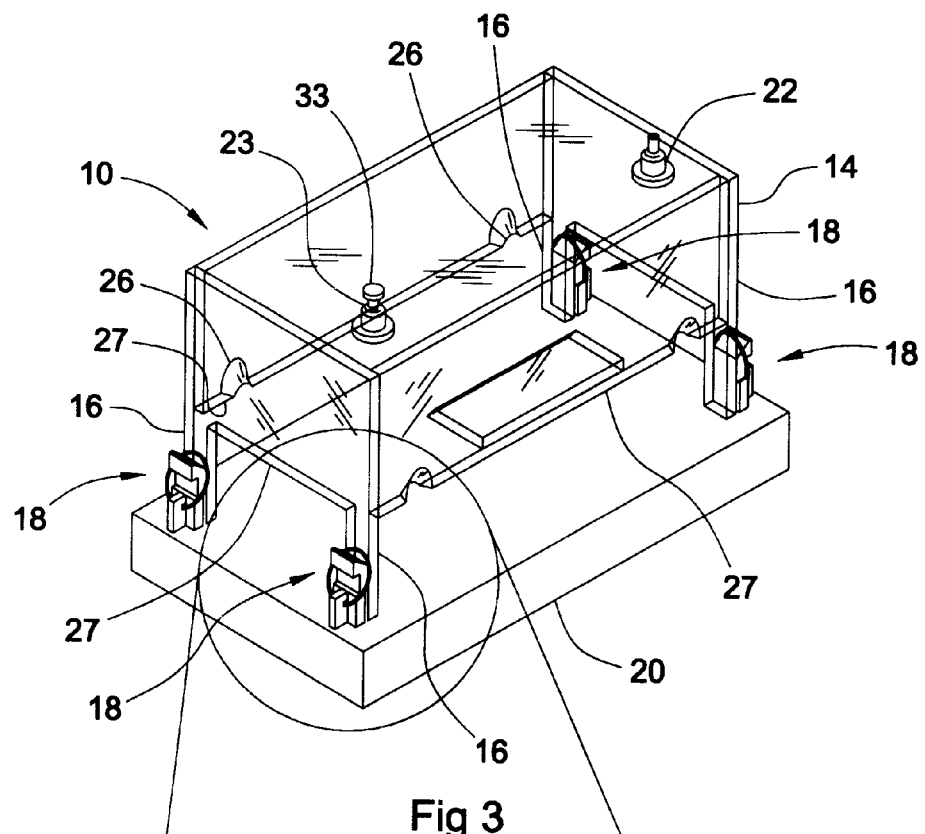
FIG. 3 is a perspective view of the apparatus.
Figure 4:
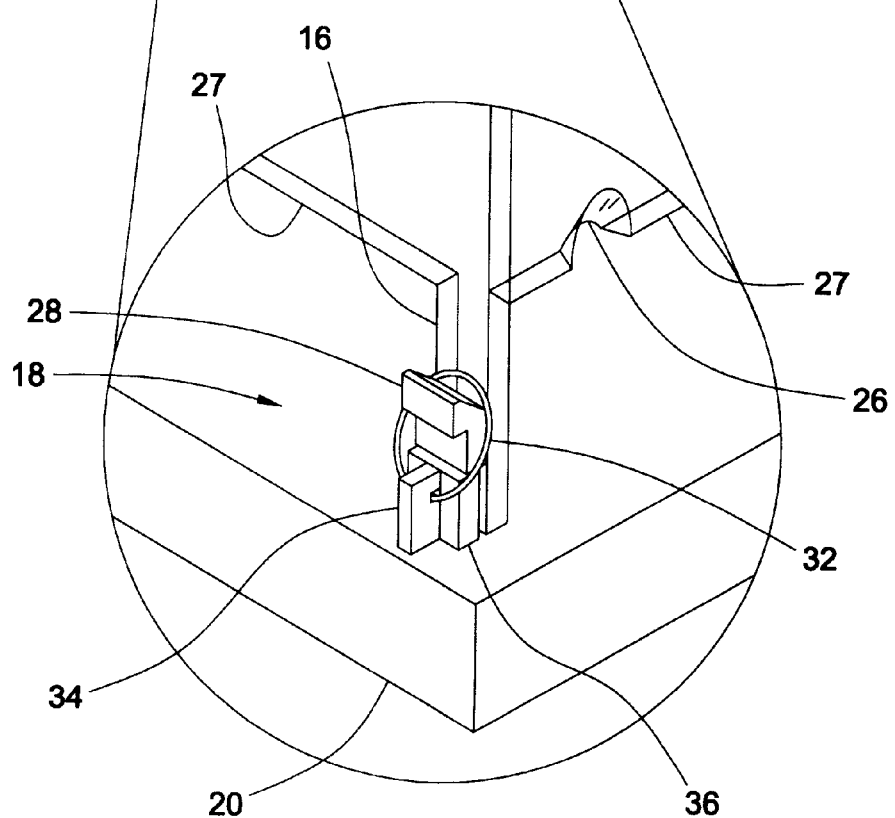
FIG. 4 is an enlarged fragmentary perspective view of certain parts shown in FIG. 3.

In the embodiment shown, the upper portion of the housing 14 (FIG. 2) includes a horizontal top, and vertical side walls extending downwardly therefrom. The top and side walls are either integrally formed, or sealed together to establish air-tight joints. An air hose 24 is connected to a connector 22 attached to the housing to provide a supply of fresh air into the enclosure. To this end, the inlet of the air hose is connected to a pump (not shown) for pumping air flow through the hose and into the housing as indicated in FIG. 2. To maximize the visual effect, and to provide for safe handling, the housing is preferably made from a resilient, lightweight, and transparent material such as acrylic sheet or Plexiglas.

Further in the embodiment shown, the open lower portion of the housing 14 (FIG. 1) is formed with generally horizontal lower edges 27 spaced above the base 20. In this instance, legs 16 extend downwardly from the side walls of the housing and are adapted to rest on the base 20. The legs are sized such that the height of the lower edges 27 of the housing are raised above the base. This arrangement permits entry into and exit from the housing 14 by the air-breathing creatures, and the air pressure resulting from air flowing into the housing maintains the water level generally at the lower edges 27 of the housing as shown in FIG. 2.

It is noted that a continuous flow of air is not necessary to provide an air-filled, underwater environment as provided for herein. Once an air-chamber is established in the enclosure, the connector 22 or hose 24 may plugged, and the air will remain within the housing. However, it is preferred to maintain a supply of fresh air flowing through the chamber. A continuous air supply refreshes the air within the enclosure, cleans the surface of the water inside the enclosure, reduces the humidity within the enclosure to keep the sides of the enclosure from fogging-up, creates air movement in the enclosure for the air-breathing creatures, and helps oxygenate the aquatic environment for the aquatic creatures.

In keeping with the invention, a "dry-land" crawling surface 21 is established in the air-filled chamber in the housing 14, simulating land to create an underwater island with accessible entry and exit from the water, generally on all sides thereof. In the embodiment shown (FIG. 1), objects are positioned on the base 20 below the housing, and are sized to extend above the level of the edges 27, and thus out of the water and into the air-filled chamber. Such objects may be decorative items such as rocks 31 or driftwood (not shown), and should be positioned to promote easy access up into the air-filled enclosure by the air-breathing creatures. Preferably, the crawling surface enables the creatures to get completely out of the water.

It will be apparent that the dry-land crawling surface may also be provided within the scope of the invention for permitting activities normally performed on "dry-land" out of the water with, for example, a generally horizontal platform 120 (shown in dotted lines in FIG. 1) connected to the inside wall of the housing and that may or may not extend fully between the adjacent side walls, or suspended from the top of the housing, and thus need not necessarily be "surrounded" on all sides by water in the sense of a "conventional" island, but may be exposed to water at, for example, only one side.

In further keeping with the invention, cut-outs 26 are formed in the lower edges 27 of the housing 14 to provide for controlled escape of air from the housing. Preferably, the cutouts are formed with a lower edge portion that curves upwardly when viewed as shown in FIG. 1, are formed with a radius profile as seen in FIG. 7, and slope upwardly upon progressing from the outer edge portion of the side wall toward the inner edge portion as shown at 35 in FIG. 7. Such cone-shaped cut-outs provide for controlled formation of air bubbles 29, thus reducing the turbulence in the aquarium that would otherwise result from the escape of air from the housing.

The habitat 10 may be installed by simply placing the assembled unit into the aquarium 12. However, a preferred method of installation is to first position the base 20 at the bottom of the aquarium, create the desired landscape or crawling surface for the underwater island, then submerge the housing 14 in while tipped such that the housing fills with water, orient the housing as generally shown, and then connect the housing to the base. After the habitat is resting on the bottom of the aquarium, the air-hose 24 is connected and air is supplied to force the water out of the housing and establish the air-filled chamber. This installation procedure eliminates the buoyancy forces acting upwardly on the housing as it is positioned into the aquarium, and is particularly useful for larger habitats the base is relatively heavy, and handling the entire assembled habitat is difficult because of its size.

Figure 14:
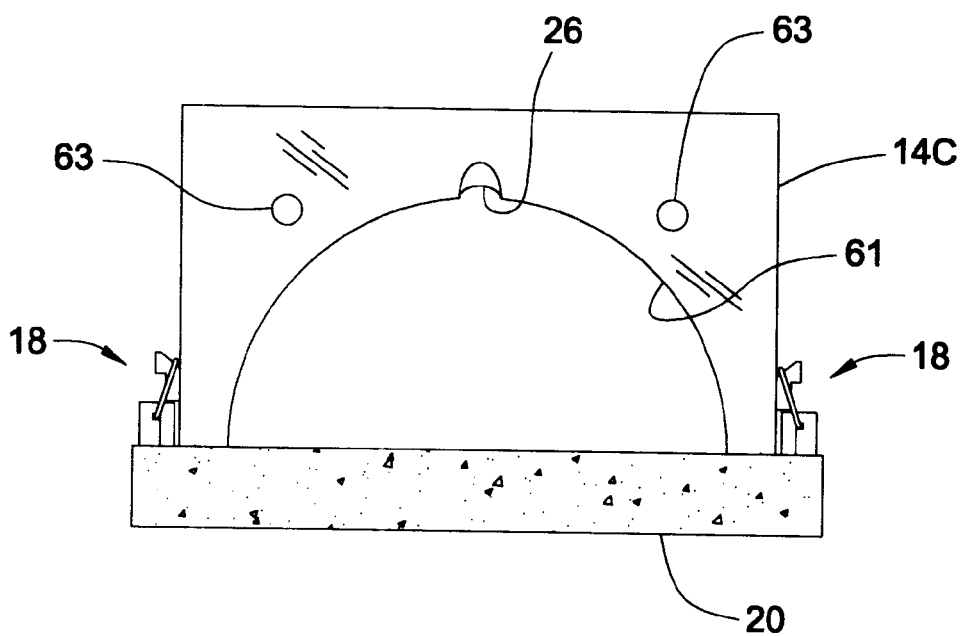
FIG. 14 is a view similar to FIG. 1 of still another alternate embodiment of the invention.

In an alternate embodiment (FIG. 14), the lower edge portions of the housing 14C are not horizontal, but are instead formed to provide one or more generally upside-down U-shaped openings 61 for access into the housing. In this instance, the cut-outs 26 are preferably positioned near the top of the opening 61, and the water level inside the housing is maintained at the level of the cut-outs. As is evident, other shaped openings such as through holes 63 may alternately be formed in the sides of the housing for the purpose of exhausting air from the housing.

As mentioned above, the housing 14 and base 20 are preferably releasably connected together to enable installation of the base and then the housing, and for removal of the housing from the aquarium without disturbing the base and the crawling surface. In one embodiment, a conventional elastic o-ring 32 is used to releasably secure the housing to the base. To this end, means are provided for connecting the o-ring to one of the base or the housing, and for releasably connecting the o-ring to the other. The o-rings are sized to withstand the buoyancy forces acting on the housing as the air-filled housing raises or tends to raise upwardly from the base.

The o-ring 32 is received into hook means such as an opening or slot 38 (FIG. 6) formed in a post 34 that is connected to the base 20. The o-ring, for example, may be trapping into the slot 38 by connecting a post 36 to the base adjacent the post 34 to close off the slot 38 after the o-ring is positioned therein. With the legs 16 resting on the base, the o-ring is stretched upwardly and around hook 28 connected to the leg 16. To ensure that the o-rings do not slip from the hooks, each o-ring is positioned between the inside surface 30 of the hook and the outer surface of the leg 16. With this arrangement, to remove the housing from the base requires that the o-ring be simply stretched upwardly over and back off of the hook.

Alternately, the habitat may be equipped with a removable o-ring 32. In this instance, the leg 34B (FIG. 10) is formed with a hook means such as slot 38B having an initial width that is slightly narrower than the diameter of the o-ring, but having a root portion sized to slidably receive the o-ring. With this arrangement, the o-ring may by installed into the slot 38B by pushing it through the narrowed portion of the slot, and it may be manually removed from the slot, but the narrowed restriction will keep the o-ring from slipping out of position on its own accord during the time that it is not engaged with the hook 28, such as when the housing has been removed from the base.

Figure 9:
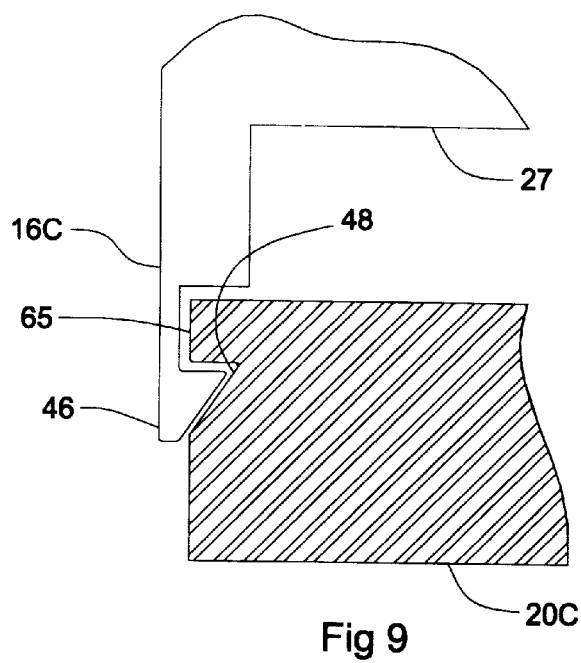

It will be apparent that other means may be utilized to secure the housing in the aquarium, For example, the housing and base may include complimentary interlocking first and second hook means such as tabs and slots. In the embodiment shown in FIG. 9, the tabs 46 are formed at the ends of the legs 16C, and the slots 48 are formed in the sides of the base 20C such that the tabs and slots are horizontally aligned when the housing is resting on the base. In this instance, the legs are adapted to resiliently bow outwardly (i.e., to the left as viewed in FIG. 9) as the housing is lowered into position on the base and the tabs slip down over the upper edge portion 65 of the base. The legs then resiliently return to the position shown as the tabs align with the slots.

Figure 8:
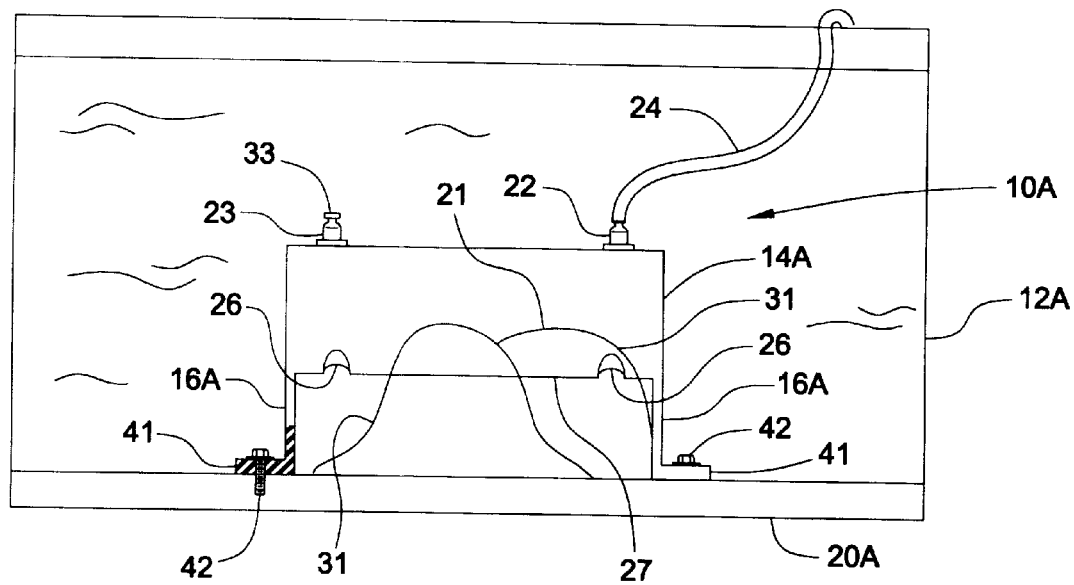
FIG. 8 is a view similar to 1 of an alternate embodiment for releasably connecting a housing and a base of the apparatus.

In still another alternate embodiment (FIG. 8), the aquarium 12A is specially adapted for use with habitat 10A which is fastened directly to the base 20A of the aquarium with bolts 42. In this instance, the legs 16A include outwardly extending flanges 41 formed with openings sized to slidably receive the bolts, and the bolts are threaded into openings formed in the base for securing the housing 14A directly thereto.

In still another alternate embodiment (not shown), the housing is connected to the side wall of the aquarium such that the side wall functions as a "base" for retaining the housing submerged in the water.

Figure 13:
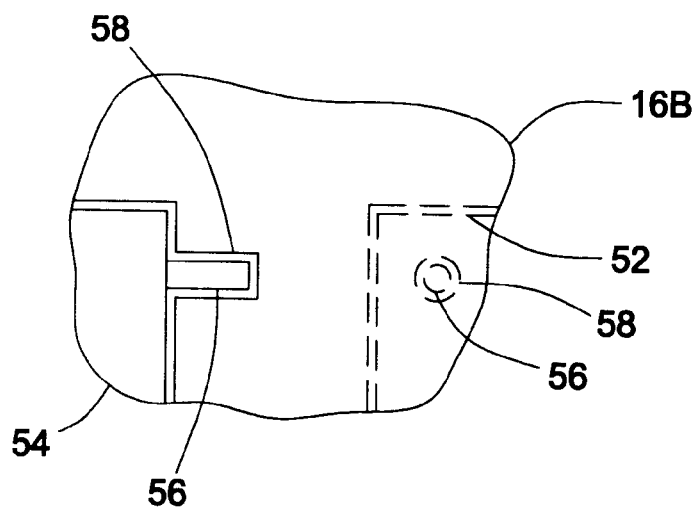
FIG. 13 is an enlarged fragmentary view as seen substantially along the line 13—13 of FIG. 12.

An embodiment adapted to restrict movement into and out of the habitat is especially useful for keeping creatures, such as poisonous frogs, away from the fish and other species in the aquarium. To provide such an environment, the habitat 10B (FIG. 11–13) is equipped with front and rear panels 52 and sides 54 adapted to generally close the area between the housing 14B and the base 20. In the embodiment shown, horizontal pins 56 extend from the sides of the panels 52, 54 and are rotatably received into horizontally extending openings 58 formed in the legs 16B. Such an arrangement restricts movement in and out of the habitat, but enables the panels to be temporarily raised or swung upwardly for purposes such as putting in or removing creatures from the habitat, or for feeding the creatures confined therein. Openings 60 may also be provided in the panels to allow circulation of water through the enclosure, and for inserting food into the habitat for the creatures confined therein.

The panels 52, 54 are preferably made from resilient material such as Plexiglas to enable the pins 56 of the panels to be inserted into the holes 58 without providing for a lead-in slot or other similarly functional feature. With this arrangement, the panels may be installed into the housing by bowing the panels in the center to allow the pins to slip into the holes, after which the panels will resiliently return to the original shape. The panels 52 may also be equipped with handles 62 to aid in manually raising the panels.

In certain instances, it is desirable to flow a relatively large volume of air through the housing 14. For example, if a water-fall (not shown) is located within the housing, the falling water will tend to raise the humidity in the housing. Increased air exchange through the housing will lower the humidity and prevent condensation from developing on the walls. However, depending on the size of the aquarium 12 and the volumetric flow rate of the air, it may be undesirable for the entire volume of air to escape through cut-outs 26 into the water in the aquarium. To this end, the habitat 10 may include a vent hose 25 (FIG. 1) connected to a second connector 23, the end of the vent hose opposite the connector being attached to a control valve or other restriction (not shown) to control the volumetric flow rate of air escaping through the hose 25. The humidity can then be maintained at a desired level by adjusting the air flow rate into the housing, and the volume of such air that passes through cut-out 26 into the water can be controlled through the use of the exhaust hose arrangement. A removable plug 33 may be installed to close the connector 23 when the exhaust hose 25 is not used.

It is noted that controlling the differential flow rate through the housing may affect the level of the water in the housing. For example, if the size of the exhaust hose 25 is substantially larger than the inlet hose 24, the pressure in the housing will drop, and the level of water will raise in the housing above the cut-outs. In this instance, air would no-longer exhaust through cut-outs 26. Advantageously, in such instances, the noise caused by air exhausting through cut-outs 26 may be completely eliminated, and the water level is maintained at a desired level as determined by the pressure that is allowed to build within the enclosure.

Figure 16:
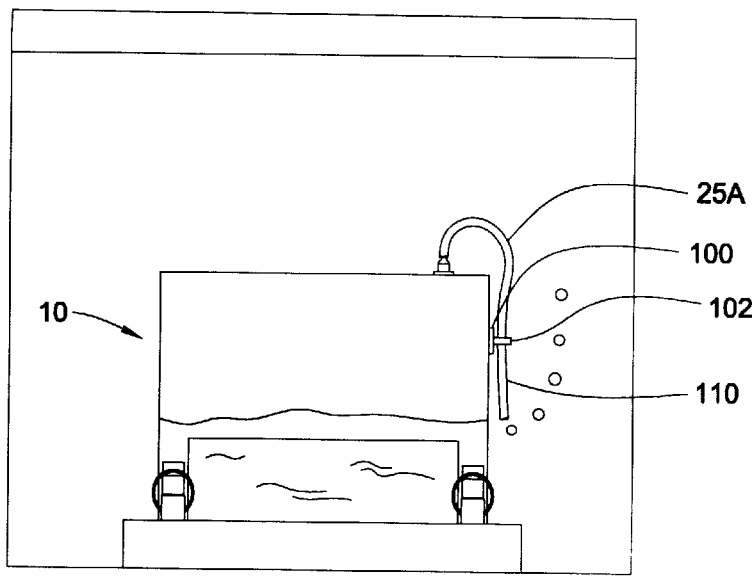
FIG. 16 is a side view of the embodiment of FIG. 15, and showing the outlet end of an exhaust hose establishing the position or level of water in the apparatus.
Figure 17:
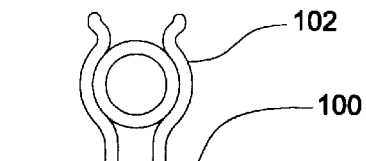
FIG. 17 is an enlarged view taken substantially along the line 17—17 of FIG. 15.

In accordance with another aspect of the invention, the habitat 10 (FIGS. 15–16) is provided with means for adjusting the position of the outlet end 110 of an exhaust hose 25A that exhausts directly into the water in the aquarium to adjust and establish the water level in the habitat 10 at a desired height. In the embodiment shown, the habitat is provided with a pliable suction cup 100 equipped a hook or resilient pliable clip apparatus 102 (FIG. 17). The suction cup is slidably positioned and positionable on the side of the habitat as shown, or the inside of the aquarium, and the clip is connected to the exhaust hose. The clip may be either fixedly connected to the hose, or is preferably adapted to slidably but snugly hold the hose. With this arrangement, the outlet end of the exhaust hose may be raised and lowered by either sliding the suction cup up and down the side of the habitat, or preferably by simply sliding the hose in the snugly fitting clip. The level of the water in the habitat raises and lowers as the outlet end of the hose is raised and lowered, respectively, and will stabilize at a level approximately at the height of the hose outlet. With this arrangement, for example, the water level can be normally maintained at a height above the cut-outs 26 to prevent any air from normally escaping therefrom, and provides for controlled exhaust through the end of the hose 25A at a desired location in the aquarium. The water level may be lowered, for example, to allow air to escape through the cut-outs 26, such as to allow contaminant that may build-up on the water surface within the habitat to escape and be cleansed in the aquarium filtering system. It will be apparent to those skilled in the art that other adjustable or snugly fitting hook or clip apparatus may suitably be used to provide for adjustment of the outlet end of the exhaust hose 25A, and thus provide for adjustment of the height of the water level in the habitat, within the scope of the present invention. It will also be apparent that a bendable, semi-rigid exhaust tube 25A may be provided such that the height of the outlet is adjusted by reshaping the tube, the tube being sufficiently stiff to retain its re-bent shape.

Figure 15:
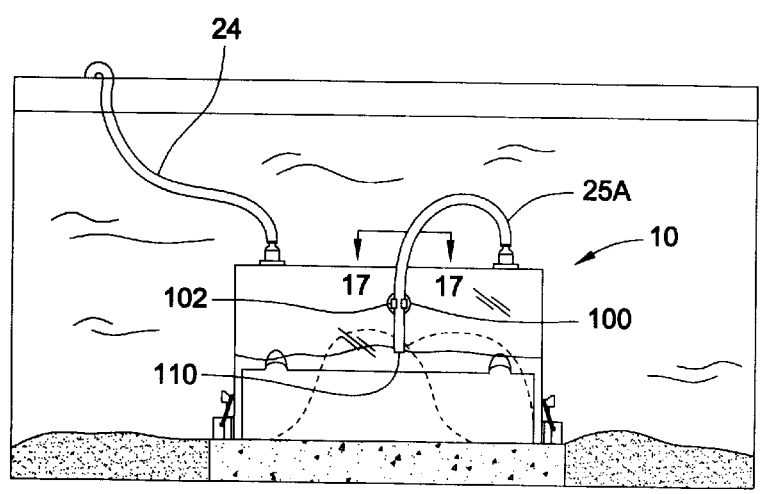
FIG. 15 is a view similar to FIG. 1 of an alternate embodiment adapted for adjusting the height of the water level within the apparatus.
Figure 18:
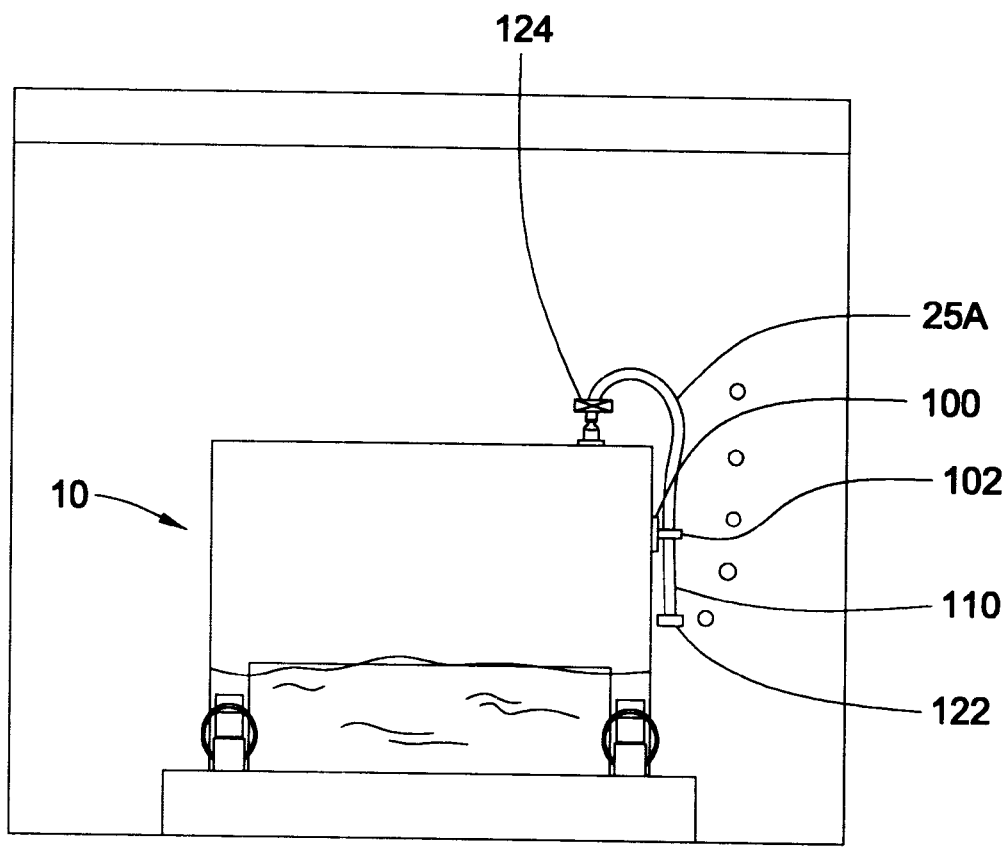
FIG. 18 is a view similar to FIG. 16 but illustrating an alternate arrangement for changing the water level in the housing.

Alternately, a plug or cap 122 or flow control valve 124 (FIG. 18) is provided for adjusting the water level in the housing downwardly from a level established by the outlet of the exhaust hose 25A when fully open. In one instance, the plug or cap is releasably inserted into or otherwise connected to the exhaust hose outlet to prevent the air from exhausting therethrough. As a result of blocking the exhaust hose, the pressure will build in the air pocket and the water level will drop from its normal level (such as shown in FIGS. 15 and 16) to a lower limit level established by the cut-outs 26 or the lower edges 27 of the housing such as shown in FIG. 18. In the case of a flow control valve, it is positioned at a convenient location in the air exhaust circuit for selectively restricting flow through the exhaust hose. The flow control valve can be used to adjust the level of water to its normal level (established by the height of the exhaust tube outlet opening) with the valve full open, to its lower limit such as shown in FIG. 18 with the valve full closed for exhausting air out the sides of the housing.

The several embodiments shown and described herein are adapted for use in the size and type of aquarium that is typically found in a home or business. It will be apparent that equivalent embodiments as described herein may be used in connection with the invention disclosed herein. It will further be apparent that a habitat within the scope of the present invention may be used in other aquatic environments such as large enclosed bodies of water such as are found in "public" aquariums and swimming pools. In such instances, it will be apparent that alternate embodiments or systems for the purposes described herein, including means for securing the housing to a base or for providing for variable air exchange are within the scope of the present invention.

I claim:

1. Apparatus adapted to create a submerged, life-supporting environment for air-breathing creatures in an enclosure containing water, said apparatus comprising:

a submerged base defined by the bottom of the enclosure;

a submerged housing;

submerged means attaching the housing to the base of the enclosure such that a water line is established in the housing defining an air pocket therein; and surface means in said air pocket to create an underwater island.

2. Apparatus as defined in claim 1 in which said surface means extends from underwater to above the water level into the air pocket.

3. Apparatus as defined in claim 1 further comprising air supply means connected to the housing for supplying air circulation therethrough.

4. Apparatus as defined in claim 3 in which said housing includes a downwardly facing edge portion having a cut-out formed with an upwardly extending radius, said cut-out sloping upwardly upon progressing inwardly toward the interior of said housing.

5. Apparatus as defined in claim 1 in which the surface means creating said island is exposed to water along at least one side portion thereof.

6. Apparatus as defined in claim 1 in which the surface means creating the island is surrounded by water along all sides.

7. Apparatus adapted to create a submerged, life-supporting environment for air-breathing creatures in an enclosure containing water, said apparatus comprising:

a base portion removably resting on the bottom of said enclosure;

a submerged housing having a closed upper portion and an open lower portion to allow entry into and exit from said housing by said creatures, said open lower portion having a downwardly facing edge portion having a cut-out formed with an upwardly extending radius, said cut-out sloping upwardly upon progressing inwardly toward the interior of said housing;

submerged means for releasably connecting said housing to said base portion;

air supply means connected to said housing such that the air pressure evacuates the water from said housing to create an air-pocket therein; and a crawling surface for the creatures in said air pocket.

8. Apparatus as defined in claim 7 in which said crawling surface extends from underwater into the air pocket.

9. Apparatus as defined in claim 7 in which said connecting means first and second hook means connected to base portion and said housing, respectively.

10. Apparatus as defined in claim 9 in which said connecting means further includes resilient means releasably connecting means first and second hook means.

11. Apparatus adapted to create a submerged, life-supporting environment for air-breathing amphibians and like creatures in an enclosure containing water, said apparatus comprising:

a weighted base portion resting on the bottom of the enclosure;

a housing having a closed upper portion and a substantially open lower portion, said lower portion having a downwardly facing edge portion, said edge portion having a cut-out formed with an upwardly extending radius for aiding in the controlled formation of bubbles as air exits the housing;

means for releasably connecting said housing with said base portion; and air supply means connected to said housing such that the air pressure evacuates the water from said housing to a horizontal position generally coincident with said edge portion.

12. Apparatus adapted to create a submerged, life-supporting environment for air-breathing creatures in an enclosure containing water, said apparatus comprising:

a base;

a housing having a closed upper portion with an air pocket defined therein, and having an open lower portion;

means for connecting the housing to and in fixed relation to the base;

a crawling surface extending into the air pocket in the upper portion of said housing; and a door pivotally connected for movement between an open position for permitting entry into and exit from the housing by the creatures, and a closed position preventing such movement to and from the housing.

13. Apparatus as defined in claim 12 in which said door is releasably connected to said housing.

14. Apparatus as defined in claim 12 in which said door is provided with openings for inserting food into the interior of said housing when the door is closed.

15. Apparatus adapted to create a submerged, life-supporting environment for air-breathing creatures in an enclosure containing water, said apparatus comprising:

an inverted housing submerged in the enclosure;

air supply means operably connected to the housing for supplying air thereto and creating an air pocket therein, the lower level of the air pocket being defined in part by the water level in the housing;

air exhaust means operably connected to the air pocket in said housing and having an outlet for exhausting air therefrom; and at least one of (i) means for adjustably positioning and (ii) means for restricting the air flow through the outlet of said air exhaust means so as to adjustably establish the water level in said housing.

16. Apparatus as defined in claim 15 in which positioning means includes resilient clip means snugly receiving said air exhaust means.

17. Apparatus as defined in claim 15 in which said positioning means includes clip means adjustably connected to said housing.

18. Apparatus as defined in claim 15 in which said restricting means includes at least one of (i) a plug for alternately blocking and permitting flow through the outlet of said air exhaust means and (ii) a flow control valve.

\* \* \* \* \*